United States Patent
Morozini De Lira (10) Patent No.: US 12,115,926 B2
(45) Date of Patent: Oct. 15, 2024

(54) MOTOR VEHICLE AND METHOD FOR OPERATING A MOTOR VEHICLE

(71) Applicant: Dr. Ing. h.c. F. Porsche Aktiengesellschaft, Stuttgart (DE)

(72) Inventor: Adriano Morozini De Lira, Stuttgart-Vaihingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/219,772

(22) Filed: Jul. 10, 2023

(65) Prior Publication Data
US 2024/0010156 A1    Jan. 11, 2024

(30) Foreign Application Priority Data
Jul. 11, 2022 (DE) .................... 10 2022 117 213.9

(51) Int. Cl.
*B60R 21/231* (2011.01)
*B60R 21/00* (2006.01)
*B60R 21/261* (2011.01)

(52) U.S. Cl.
CPC ...... *B60R 21/231* (2013.01); *B60R 21/23138* (2013.01); *B60R 21/261* (2013.01); *B60R 2021/0034* (2013.01); *B60R 2021/0044* (2013.01); *B60R 2021/0048* (2013.01); *B60R 2021/23107* (2013.01); *B60R 2021/23153* (2013.01)

(58) Field of Classification Search
CPC ............ B60R 21/231; B60R 21/23138; B60R 21/261; B60R 2021/0034; B60R 2021/0044; B60R 2021/0048; B60R 2021/23107; B60R 2021/23153
See application file for complete search history.

(56) References Cited

U.S. PATENT DOCUMENTS

| | | | | |
|---|---|---|---|---|
| 3,879,056 | A | * | 4/1975 | Kawashima .......... B60R 21/233 280/743.2 |
| 5,324,072 | A | * | 6/1994 | Olson ............... B60R 21/23138 280/730.2 |
| 5,607,183 | A | * | 3/1997 | Nishimura ............ B60R 21/233 280/743.1 |
| 5,618,595 | A | * | 4/1997 | Matsushima ............. B32B 1/00 442/183 |

(Continued)

FOREIGN PATENT DOCUMENTS

| | | |
|---|---|---|
| DE | 4409770 A1 | 9/1995 |
| DE | 19647611 A1 | 5/1998 |

(Continued)

*Primary Examiner* — Amy R Weisberg
*Assistant Examiner* — Tiffany L Webb
(74) *Attorney, Agent, or Firm* — Buchanan Ingersoll & Rooney PC (57) ABSTRACT

A motor vehicle having a vehicle cabin, in which at least one front seat and at least one rear seat are arranged, and having a side impact protection system including an airbag apparatus associated with the front seat and an airbag apparatus associated with the rear seat. In order to functionally improve the motor vehicle, the airbag apparatuses include a respective chest airbag and a head airbag, wherein the chest airbag and the head airbag are inflatable by a common gas generator via a manifold.

8 Claims, 6 Drawing Sheets

(56) References Cited

U.S. PATENT DOCUMENTS

| | | | |
|---|---|---|---|
| 5,879,767 A * | 3/1999 | Matsushima | B32B 5/26 |
| | | | 428/36.1 |
| 5,921,576 A | 7/1999 | Sinnhuber | |
| 6,220,629 B1 | 4/2001 | Wipasuramonton et al. | |
| 6,543,804 B2 * | 4/2003 | Fischer | B60R 21/26 |
| | | | 280/736 |
| 7,021,652 B2 * | 4/2006 | Kumagai | B60R 21/26 |
| | | | 280/730.2 |
| 7,350,852 B2 * | 4/2008 | Rust | B60R 21/16 |
| | | | 296/146.7 |
| 7,357,411 B2 * | 4/2008 | Kurimoto | B60R 21/261 |
| | | | 280/730.2 |
| 7,506,892 B2 * | 3/2009 | Klinkenberger | B60R 21/2338 |
| | | | 280/743.2 |
| 8,231,138 B2 * | 7/2012 | Sadr | B60R 21/235 |
| | | | 280/730.2 |
| 8,544,880 B2 * | 10/2013 | Sadr | B60R 21/13 |
| | | | 280/730.2 |
| 8,801,032 B2 * | 8/2014 | Sadr | B60R 21/217 |
| | | | 280/730.2 |
| 8,851,510 B1 * | 10/2014 | Dinsdale | B60R 21/23138 |
| | | | 280/730.2 |
| 9,085,275 B2 * | 7/2015 | Sadr | B60N 2/914 |
| 9,731,675 B2 * | 8/2017 | Sadr | B60R 21/217 |
| 10,065,595 B1 * | 9/2018 | Kipnis | B60R 21/2334 |
| 10,315,608 B2 * | 6/2019 | Sadr | B60R 21/235 |
| 10,525,925 B2 | 1/2020 | Deng et al. | |
| 10,696,264 B2 * | 6/2020 | Suemitsu | B60R 21/231 |
| 11,648,907 B1 * | 5/2023 | Faruque | B60R 21/213 |
| | | | 280/730.2 |
| 11,667,257 B2 * | 6/2023 | Farooq | B60R 21/23138 |
| | | | 280/730.2 |
| 2006/0267318 A1 * | 11/2006 | Nishikaji | B60R 21/23138 |
| | | | 280/730.2 |
| 2007/0057491 A1 * | 3/2007 | Bayley | B60R 21/21 |
| | | | 280/730.2 |
| 2021/0394700 A1 * | 12/2021 | Santín Navarro | B60R 21/232 |

FOREIGN PATENT DOCUMENTS

| | | |
|---|---|---|
| DE | 60001058 T2 | 11/2003 |
| DE | 102009031617 A1 | 3/2011 |
| DE | 102018124527 A1 | 4/2019 |
| DE | 102021120292 A1 | 4/2022 |
| EP | 0812739 A1 | 12/1997 |

* cited by examiner

MOTOR VEHICLE AND METHOD FOR OPERATING A MOTOR VEHICLE

CROSS-REFERENCE TO RELATED APPLICATION

This application claims priority to German Patent Application No. 10 2022 117 213.9, filed Jul. 11, 2022, the content of such application being incorporated by reference herein in its entirety.

FIELD OF THE INVENTION

The invention relates to a motor vehicle having a vehicle cabin, in which at least one front seat and at least one rear seat are arranged, and having a side impact protection system comprising an airbag apparatus associated with the front seat and an airbag apparatus associated with the rear seat. The invention further relates to a method for operating such a motor vehicle.

BACKGROUND OF THE INVENTION

From the German patent application DE 10 2018 124 527 A1, which is incorporated by reference herein, a vehicle door is known which comprises an airbag system having a first airbag and a second airbag arranged offset in the vehicle longitudinal direction to the first airbag, wherein the two airbags are inflatable by means of a common gas generator. An airbag system is known from the German patent application DE 44 09 770 A1, which is incorporated by reference herein, which is arranged on a vehicle door and comprises a head airbag and a chest airbag, wherein both airbags are inflatable by a common gas generator. A motor vehicle is known from the European patent application EP 0 812 739 B1, which is incorporated by reference herein, which comprises on both sides a respective front door and a respective rear door, wherein the rear door and the front door comprise a respective airbag apparatus having a plurality of airbags arranged side-by-side in the longitudinal vehicle direction and a single gas generator, wherein the airbag apparatus arranged on the rear door extends in the direction of the front seat in such a way that the airbag apparatus arranged on the rear door provides an effective protection for an occupant positioned relatively far rearward in the front seat in the event of a side impact.

SUMMARY OF THE INVENTION

Described herein is a motor vehicle having a vehicle cabin, in which at least one front seat and at least one rear seat are arranged, and having a side impact protection system comprising an airbag apparatus associated with the front seat and an airbag apparatus associated with the rear seat.

Also described herein is a motor vehicle having a vehicle cabin, in which at least one front seat and at least one rear seat are arranged, and having a side impact protection system comprising an airbag apparatus associated with the front seat and an airbag apparatus associated with the rear seat in that the airbag apparatuses comprise a respective chest airbag and a head airbag, wherein the chest airbag and the head airbag are inflatable by a common gas generator via a manifold. By separating the airbags, the respective head/chest airbag can be better matched to the physiology of the respective body part. Each airbag apparatus comprises two separate airbags for a side impact of a head and a side impact of a chest or abdomen. The two airbags each have a characteristic feature which can significantly improve the protective function for the head and chest/abdomen in case of a side impact. Both airbags are filled by a common gas generator and are advantageously installed in a compact housing. The airbag apparatus associated with the rear seat comprises a gas generator having a manifold to the two airbags of said airbag apparatus associated with the rear seat. The airbag apparatus associated with the front seat also comprises a gas generator having a manifold to the two airbags of said airbag apparatus associated with the front seat. Thus, on each side of the vehicle, there are two airbags associated with the front seat and two airbags associated with the rear seat, each being activated and inflated via a common gas generator with a common manifold.

A preferred exemplary embodiment of the motor vehicle is characterized in that a range of effect of the head airbag associated with the rear seat reaches in a longitudinal direction of the vehicle up to a range of effect of the head airbag associated with the front seat. The range of effect of the airbag is a protected area that can be illustrated with the activated, unfolded, and inflated airbag in the cabin of the vehicle. With the two head airbags, a complete side of the vehicle cabin in the longitudinal direction of the vehicle is advantageously protected. Thus, the head of a vehicle occupant can also be advantageously protected in the event of a side impact if the vehicle occupant in the front seat or in the rear seat is in a rather abnormal position, in particular a special resting seated position, such as a supine position. The optimized geometry of the head airbag advantageously protects the occupants on the front seats even in the resting positions, without reducing the protective effect for the occupants of the respective rear seat row. Resting positions referred to herein are in particular all backrest angles of the front seat that are larger than rectangular backrest positions and thus also include approximately supine seated positions of the front seat.

A further preferred exemplary embodiment of the motor vehicle is characterized in that the range of effect of the head airbag associated with the rear seat reaching to the range of effect of the head airbag associated with the front seat comprises an additional head protection portion for an occupant positioned in a supine position on the front seat, said protection portion being drawn downward in relation to the normal range of effect of the head airbag associated with the rear seat. As a result, the airbag apparatus arranged in the rear seat region can be used most effectively in case of a side impact in order to protect a person in a supine position in the front seat. In addition, the protection is also improved for occupants on rear seats who move their heads forward and/or downward. The head protection portion is pulled downward in relation to a normal protected area shown with the head airbag into a protected area that is usually rather shown with a chest airbag.

A further preferred exemplary embodiment of the motor vehicle is characterized in that a range of effect of the chest airbag associated with the rear seat covers all possible chest contact areas of a person positioned in the rear seat. This ensures that the function of the chest airbag associated with the rear seat is fully maintained.

A further preferred exemplary embodiment of the motor vehicle is characterized in that the range of effect of the chest airbag associated with the rear seat reaches in the longitudinal direction of the vehicle to the additional head protection portion of the head airbag associated with the rear seat. Thus, the protective function of the airbag apparatus associated with the rear seat can be effectively improved by relatively simple means. The head airbag of the rear seat advantageously trims the range of effect of the chest airbag of the rear seat in no area in which the occupant could experience contact with his or her chest.

A further preferred exemplary embodiment of the motor vehicle is characterized in that the chest airbag of the front seat and/or the rear seat comprise(s) an elastic and gas-tight membrane belt, which is glued along a longitudinal circumference of the chest airbag. A longitudinal circumference of the chest airbag is preferably considered to be a circumference of the chest airbag, which divides the chest airbag into two chambers in a plane arranged substantially parallel to a vehicle door, in which the chest airbag is advantageously arranged together with the respective head airbag in a common housing. The membrane belt is particularly advantageously glued to two completely separate or partially separate airbag halves of the chest airbag. The manufacture of the chest airbag is simplified by the membrane belt.

A further preferred exemplary embodiment of the motor vehicle is characterized in that the membrane belt is configured so as to be gas-tight and elastic. Due to the elasticity of the membrane belt, apertures specifically integrated into the chest airbag can be omitted, because the gas released by the gas generator can be taken up into the airbag by a deliberately permitted expansion of the membrane belt. The membrane belt also advantageously absorbs energy when intercepting occupants without becoming excessively rigid. The rigidity of the chest airbag can be advantageously adjusted by a suitable thickness, a suitable modulus of elasticity, and an exposed surface of the membrane belt. Due to a particularly efficient use of the gas volume, a smaller gas generator can advantageously be used.

A further preferred embodiment of the motor vehicle is characterized in that the membrane belt extends along an exposed curve on the chest airbag. In this context, in particular, exposed means that a work area of the membrane belt is blocked neither by occupants nor by surfaces in the vehicle. This ensures that the function of the membrane belt is not restricted during operation.

In a method for operating a motor vehicle as described above, the aforementioned task is alternatively or additionally solved in that the chest airbag and the head airbag are inflated by a common gas generator via a manifold when the airbag apparatus is activated. The airbag apparatus arranged in the rear seat region advantageously extends up to the airbag apparatus arranged in the front seat region. In addition, the region of the airbag apparatus associated with the rear seat abutting the front airbag apparatus is pulled downward. As a result, the airbag apparatus arranged in the rear seat region can be used in order to protect a person seated on the front seat in a supine position in the event of a side impact.

The invention further relates to an airbag apparatus, a chest airbag, a head airbag, a gas generator, a manifold, and/or a membrane belt for a motor vehicle described above. The aforementioned parts can be handled separately.

BRIEF DESCRIPTION OF THE DRAWINGS

Further advantages, features, and details of the invention arise from the following description, in which various exemplary embodiments of the invention are described in detail with reference to the drawing. The figures show.

DETAILED DESCRIPTION OF THE INVENTION

Figure 1:
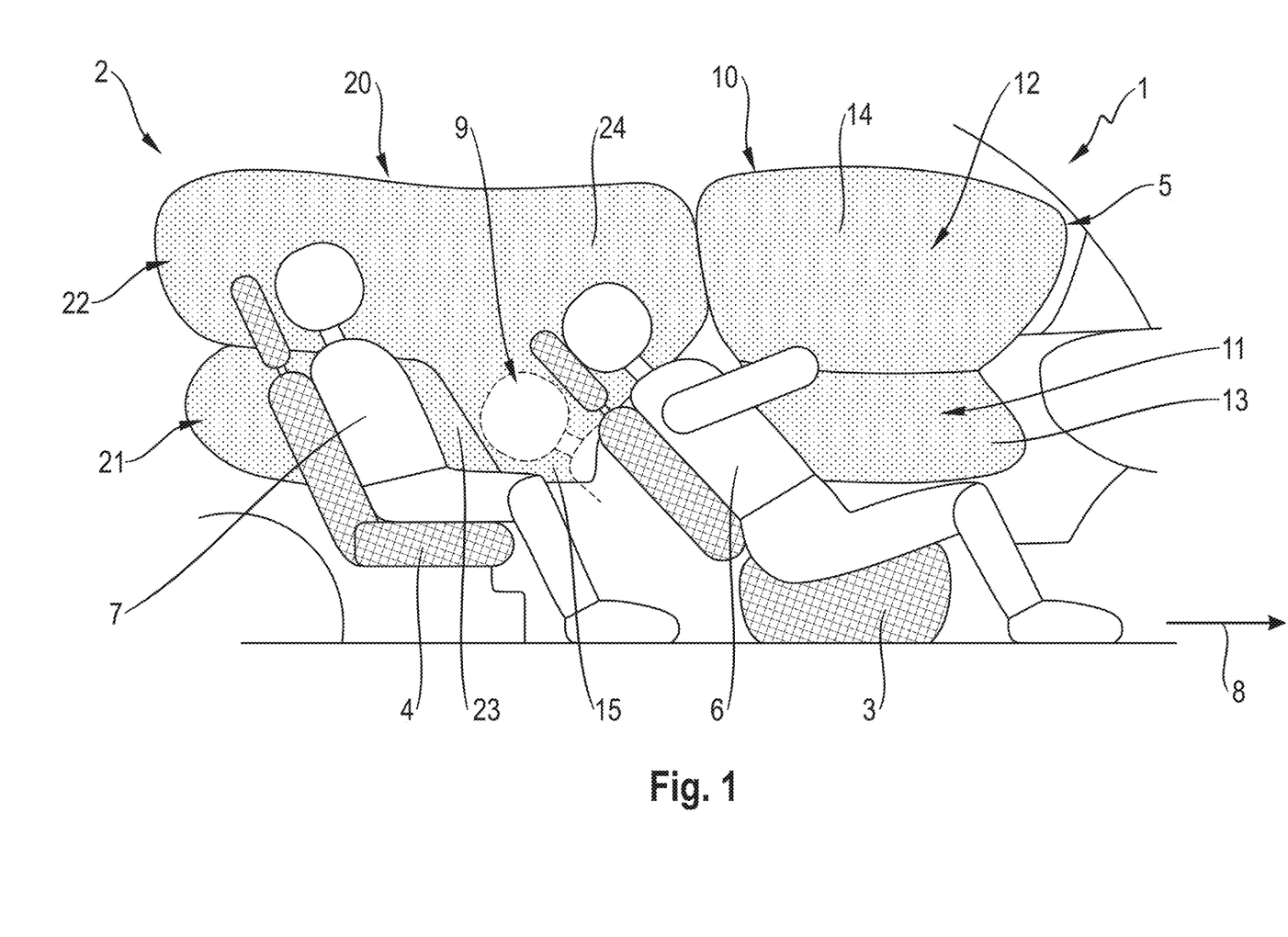
FIG. 1 depicts a schematic illustration of a vehicle cabin of a motor vehicle having a side impact protection system comprising an airbag apparatus associated with a front seat and an airbag apparatus associated with a rear seat.

FIG. 1 shows a schematic illustration of a motor vehicle 1 having a vehicle cabin 2. In the vehicle cabin 2, a front seat 3 is arranged in the front in a longitudinal direction 8 indicated by an arrow. A rear seat 4 is indicated behind the front seat 3, which is also referred to as the rear bench. A side impact protection system 5 is accommodated in the vehicle cabin 2 of the motor vehicle 1 on the side of the two seats 3 and 4.

The side impact protection system 5 serves to protect occupants 6 and 7 indicated on the seats 3 and 4 in the event of a side impact during the operation of the motor vehicle 1. Between the two occupants 6 and 7, an occupant 9 in a supine position on the front seat 3 is indicated.

The side impact protection system 5 comprises an airbag apparatus 10 associated with the front seat 3 and an airbag apparatus 20 associated with the rear seat 4. The two airbag apparatuses 10; 20 comprise a respective chest airbag 11; 21 and a respective head airbag 12; 22. In FIG. 1, ranges of effect 13, 14; 23, 24 are indicated, in which the chest airbags 11; 21 and the head airbags 12; 22 exercise their protective effect when activated in the event of a side impact.

In FIG. 1, it can be seen that the occupant 6 seated in the front seat 3, when seated in an upright position (not shown), is protected in the event of an accident by the airbag apparatus installed in the driver side door with its chest airbag 11 and head airbag 12. If the occupant 6 on the front seat 3 is in the position shown, then the head of the occupant 6 is protected by the head airbag 22 associated with the rear seat 4.

Through an improved geometry of the head airbag 22 associated with the rear seat, the occupant 9 indicated by a dashed line on the front seat 3 is also sufficiently protected in the event of a side impact, even if he or she is in a resting position or supine position on the front seat 3. For this purpose, the range of effect 24 of the head airbag 22 associated with the rear seat is expanded by a head protection portion 15, which is drawn downwards. This head protection portion 15 protects the head of the occupant 9 lying on the front seat 3 in the event of a side impact.

The occupant 7 seated in the rear seat 4 is not disadvantaged in any way by the geometry of the head airbag 22 with the head protection portion 15 being additionally drawn downwards. The occupant 7 in the rear seat 4 is sufficiently protected by the airbag apparatus 20 associated with the rear seat 4 with its chest airbag 21 and its head airbag 22.

The additional head protection portion 15 of the head airbag 22 pulled downwards additionally protects the head of the occupant 7 in the rear seat 4 even if the occupant leans forward or bends forward.

Due to the large surface area of the range of effect 24 of the head airbag 22 associated with the rear seat, there is a sufficient support effect for the airbag against twisting or exiting from the motor vehicle 1. The large surface area of the range of effect 24 of the head airbag 22 associated with the rear seat 4 further reduces the likelihood of debris penetrating into the vehicle cabin 2.

The head airbag 22 is advantageously sewn and siliconized, and thus is largely air-tight. As a result, a longer lifetime can be achieved in case of a hardness appropriate for a head impact.

Figure 2:
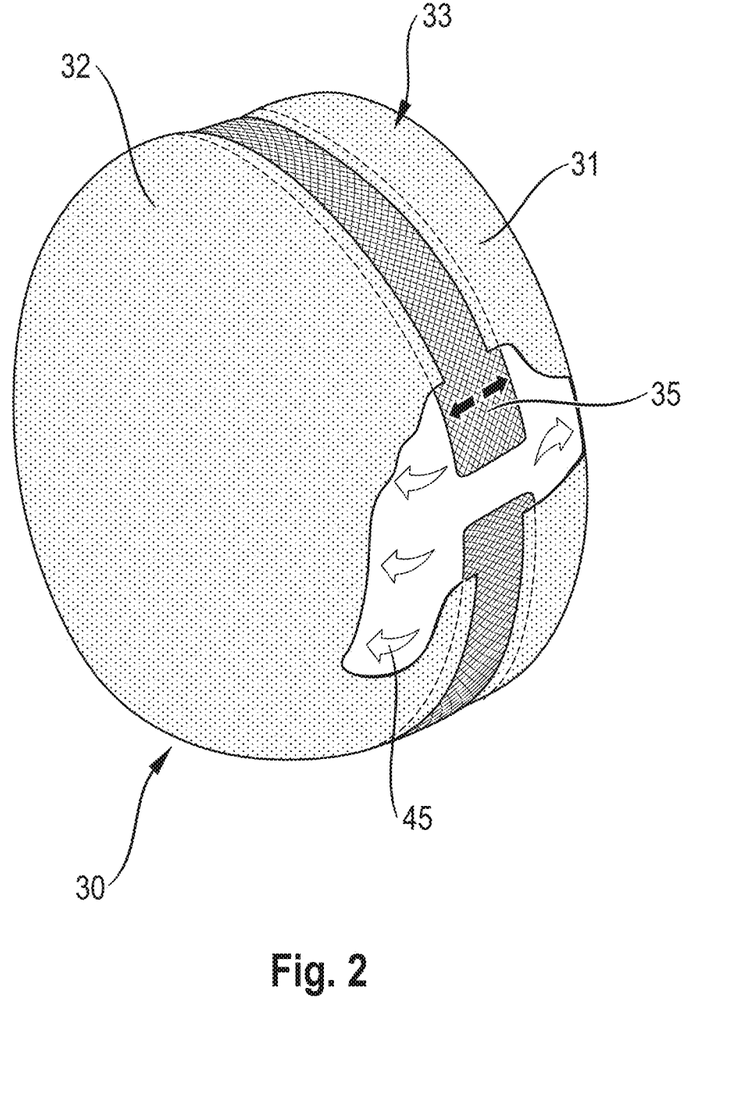
FIG. 2 depicts a schematic illustration of a chest airbag with a membrane belt in a partially sectioned view.

In FIG. 2, a chest airbag 30 is shown perspectively and partially sectioned. The chest airbag is, for example, the chest airbag associated with the front seat 3 and bearing the reference numeral 11 in FIG. 1 or the chest airbag associated with the rear seat 4 and bearing the reference numeral 21 in FIG. 1.

The chest airbag 30 shown in FIG. 2 does not have a drainage hole to regulate the hardness of the airbag and to absorb energy when intercepting an occupant.

The chest airbag 30 shown in FIG. 2 comprises a glued membrane belt 35 with elastic and gas-tight material properties. The membrane belt 35 glued to the chest airbag 30 connects two halves 31, 32 of a gas-filled chamber 33 of the chest airbag 30. The membrane belt 35 connects the two halves 31, 32 along a longitudinal circumference of the chest airbag 30.

The two halves 31, 32 joined by the membrane belt 35 are respectively arranged on the occupant side and door side such that the elastic membrane belt 35 can distort upon the unfolding and inflation of the chest airbag 30 without the chest airbag 30 being blocked upon activation.

Dashed lines indicate in FIG. 2 that the membrane belt 35 is glued to the two halves 31, 32 of the chest airbag 30. Due to the gluing, there are fewer seam-related openings through which gas can escape. As a result, the gas pressure in the chamber 33, and thus the protective effect of the chest airbag 30, can be maintained for longer in the activated state.

Furthermore, the elasticity of the membrane belt 35 ensures energy absorption when intercepting an occupant. Additionally, the elastic membrane belt 35 can be stretched in order to receive an incoming gas volume indicated in FIG. 2 by arrows 45. Thus, an undesirable bursting of the activated chest airbag 30 can be prevented.

With gas cooling in the chest airbag 30, the volume of the chamber 33 can be reduced by contracting the elastic membrane belt 35 without the chest airbag 30 collapsing.

Figure 3:
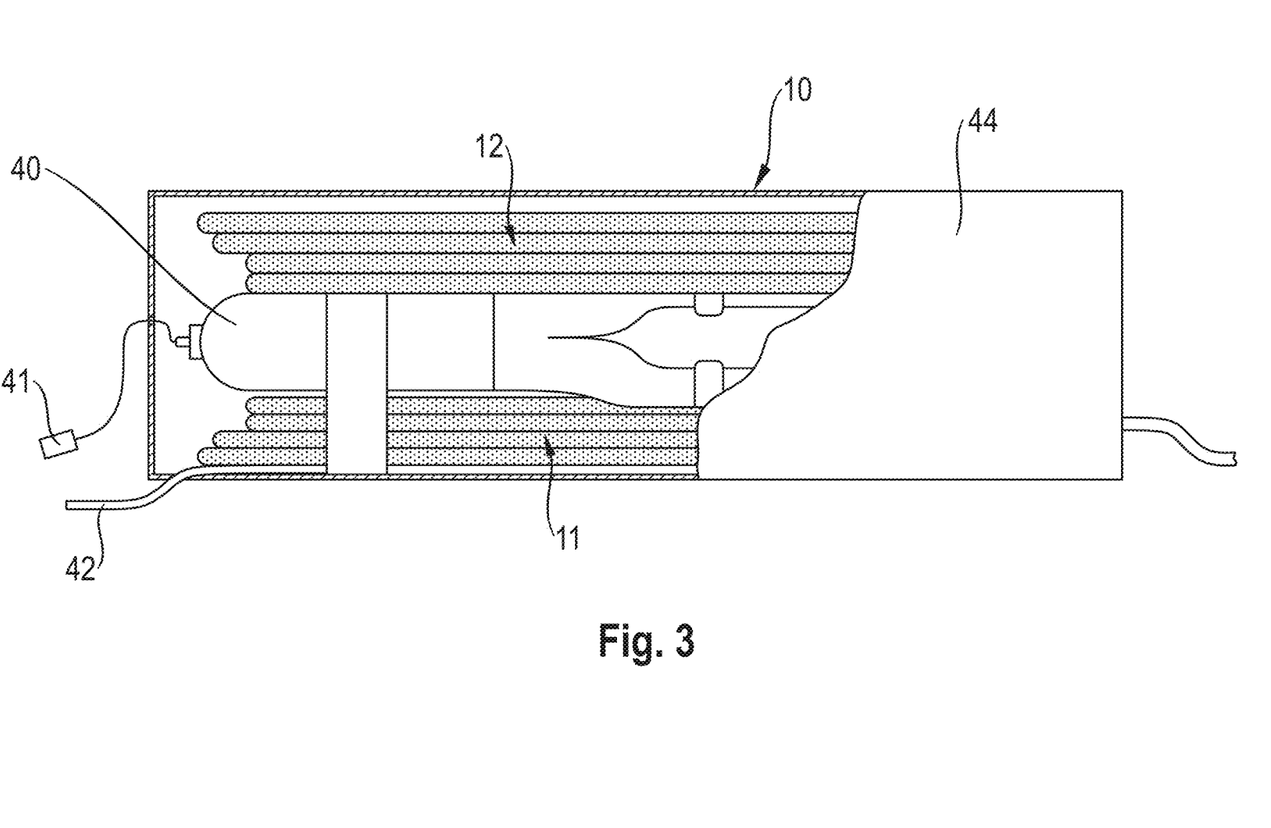
FIG. 3 depicts a housing having an airbag apparatus in a non-triggered state.

In FIG. 3, the airbag apparatus 10 with the chest airbag 11 and the head airbag 12 is shown in a non-triggered state. The airbag apparatus 10, together with a gas generator 40, is accommodated in a housing 44. A trigger 41 can be used in order to activate the gas generator Via an indicated vehicle linkage 42, the housing 44 can be integrated with the airbag apparatus 10 and the gas generator 40 into a vehicle door.

The housing 44 is shown as a box, but it can also be embodied as a non-woven bag. The housing 44 is advantageously installed in a vehicle door, advantageously on an inner side of the door.

Figure 4:
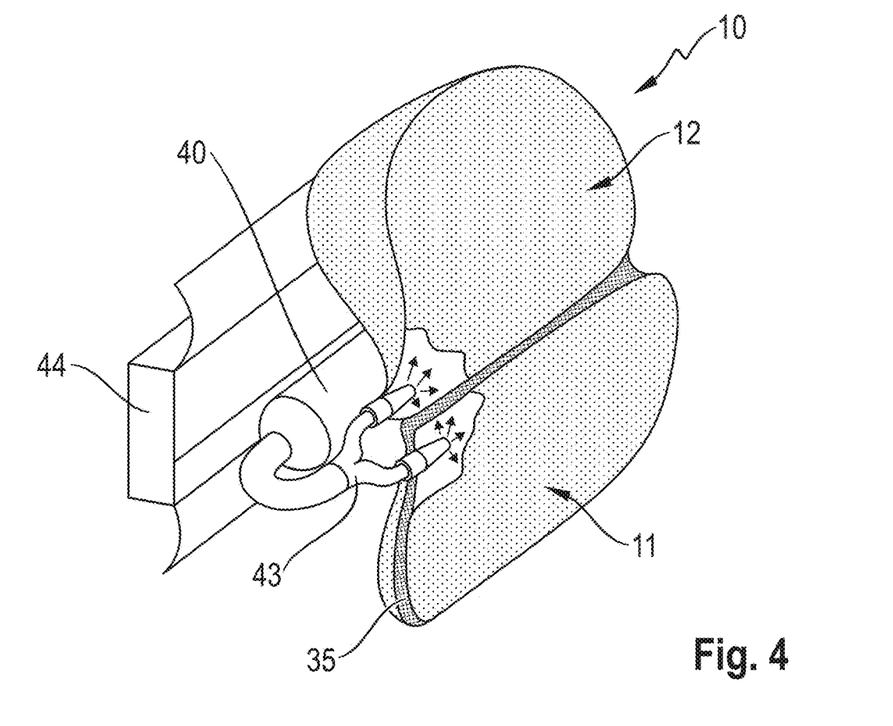
FIG. 4 depicts the airbag apparatus of FIG. 3 in a triggered state.

In FIG. 4, the airbag apparatus 10 is shown in the triggered state with the housing 44 open. The chest airbag 11 and the head airbag 12 are filled with gas by the common gas generator 40 via a common manifold 43. The gas generator 40 remains in the housing 44.

In FIG. 4, the gas generator 40 is highlighted in order to show the opened housing 44, which tears open along a target breaking point. In addition, FIG. 4 shows the elastic membrane belt 35 surrounding the chest airbag 11 along its longitudinal circumference.

Figure 5:
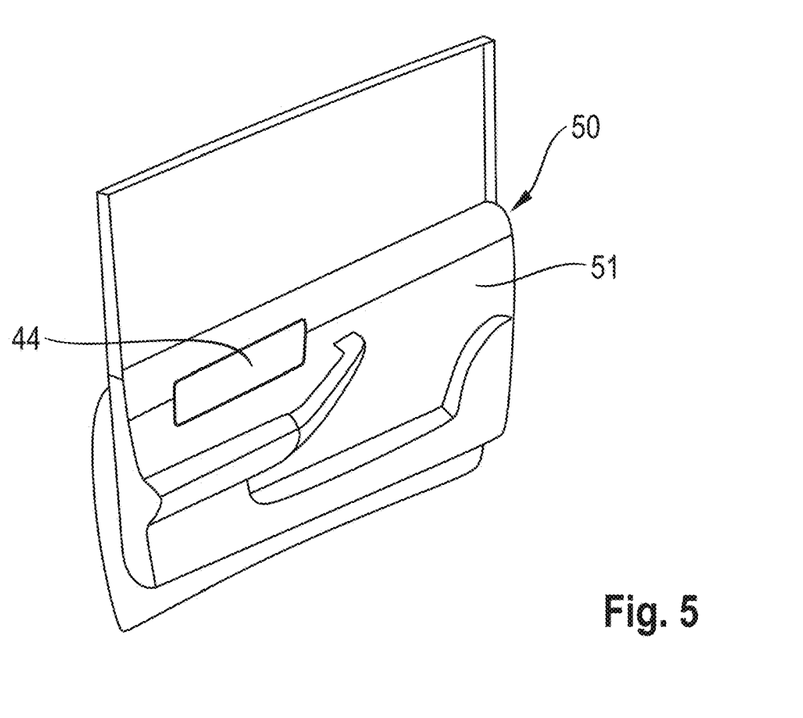
FIG. 5 depicts a vehicle door having an airbag apparatus integrated into a door paneling.

FIG. 5 shows a vehicle door 50 with a door paneling 51. The housing 44 with the airbag apparatus is positioned behind an area of the door paneling 51 equipped with target breaking points. The installation of the housing 44 with the airbag apparatus is also possible in a B-pillar or in a roof bar of the motor vehicle.

Figure 6:
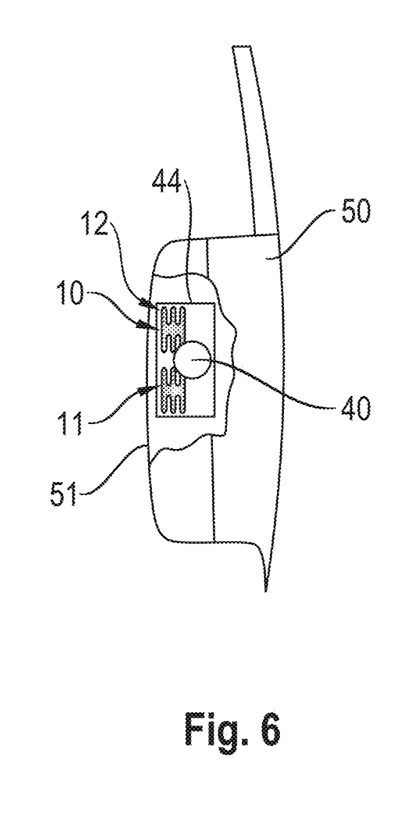
FIG. 6 depicts the vehicle door of FIG. 5 in a section prior to the triggering of the airbag apparatus.
Figure 7:
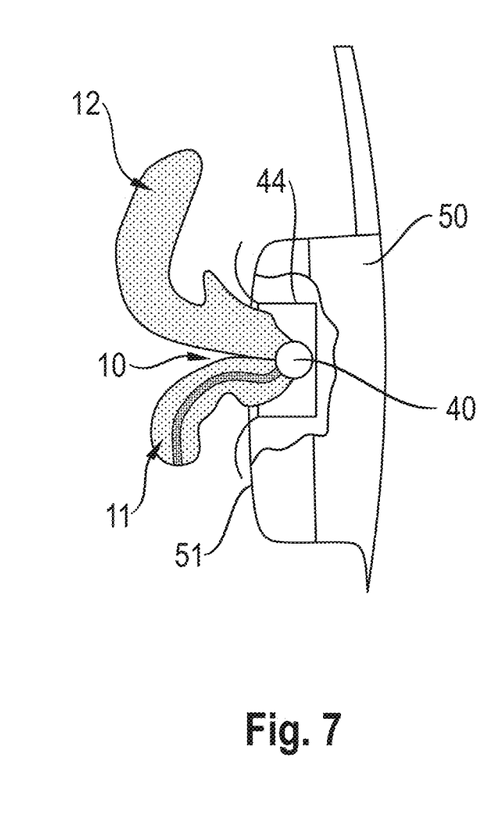
FIG. 7 depicts the door of FIG. 6 when the airbag apparatus is triggered or activated.
Figure 8:
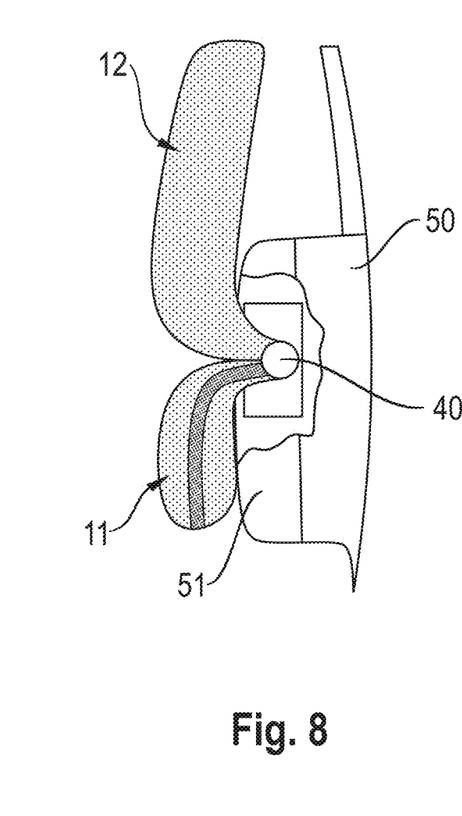
FIG. 8 depicts the door of FIGS. 6 and 7 with the airbag apparatus triggered or activated.

In FIGS. 6 to 8, the course of inflating the airbag apparatus 10 is illustrated in three successive steps. In FIG. 6, as already shown in FIG. 5, the airbag apparatus 10 is positioned in the vehicle door 50. In this illustration, the arrangement of the folded airbags 11, 12 within the housing 44 is easily discernible. The airbag apparatus 10 is visually obscured by the door paneling 51.

FIG. 7 shows the two airbags 11 and 12 shortly after the airbag apparatus 10 is triggered. Both airbags 11 and 12 are filled with gas by the gas generator 40 and break through the front of the housing 44 and the inner door paneling 51. The arrangement of the folded airbags 11, 12 in the housing 44 characterizes a pre-orientation of the chest airbag 11 and the head airbag 12.

In FIG. 8, the chest airbag 11 and the head airbag 12 are fully inflated. The head airbag 12 has a large surface area of contact with the door paneling 51, which allows the head airbag 12 to be supported and does not break through the window when an occupant is intercepted.

Figure 9:
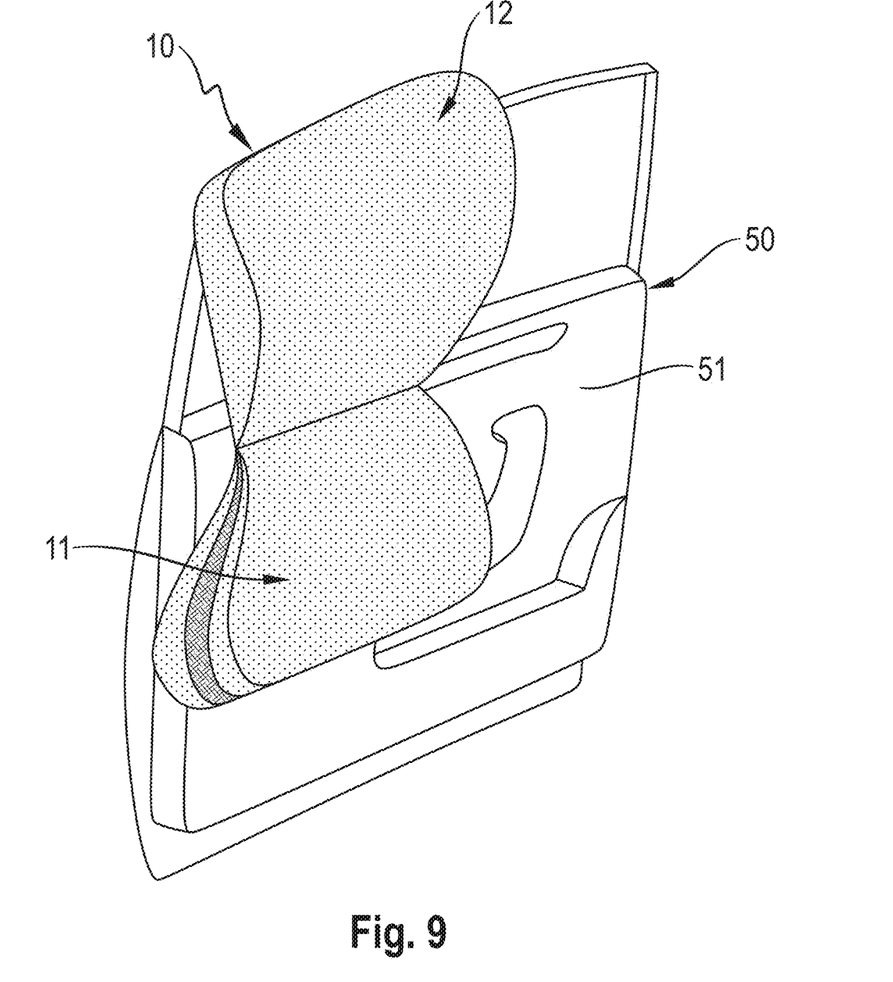
FIG. 9 depicts a perspective illustration of the door of FIGS. 6 to 8 with the airbag apparatus triggered.

In FIG. 9, the airbag apparatus 10 with the inflated airbags 11 and 12 is shown perspectively. In the illustration of FIG. 9, the geometry of the two airbags 11 and 12 is not representative of the function of the side impact protection system described above.

REFERENCE NUMERALS

1 Motor vehicle
2 Vehicle cabin
3 Front seat
4 Rear seat
5 Side impact protection system
6 Occupant
7 Occupant
8 Vehicle longitudinal direction
9 Seated occupant
10 Airbag apparatus
11 Chest airbag
12 Head airbag
13 Range of effect
14 Range of effect
15 Head protection portion
20 Airbag apparatus
21 Chest airbag
22 Head airbag
23 Range of effect
24 Range of effect
30 Chest airbag
31 Half
32 Half
33 Chamber
35 Membrane belt
40 Gas generator
41 Trigger
42 Vehicle linkage
43 Manifold 44 Housing
45 Arrows
50 Vehicle door
51 Door paneling

What is claimed is:

1. A motor vehicle comprising:
a vehicle cabin,
at least one front seat and at least one rear seat arranged in the cabin, and
a side impact protection system comprising a front airbag apparatus associated with the front seat and a rear airbag apparatus associated with the rear seat,
wherein each airbag apparatus comprises a chest airbag and a head airbag that is separate from the chest airbag, wherein the chest airbag and the head airbag are inflatable by a common gas generator via a manifold,
wherein the head airbag of the rear airbag apparatus includes an additional head protection portion to protect an occupant positioned in a supine position on the front seat, said additional head protection portion extending downward in a vertical direction beside the chest airbag of the rear airbag apparatus, and said additional head protection portion extending in a horizontal direction and located between the chest airbag of the rear airbag apparatus and the chest airbag of the front airbag apparatus.

2. The motor vehicle according to claim 1, wherein a range of effect of the head airbag associated with the rear seat reaches in a longitudinal vehicle direction up to a range of effect of the head airbag associated with the front seat.

3. The motor vehicle according to claim 1, wherein the chest airbag of the front seat and/or the rear seat comprise(s) an elastic and gas-tight membrane belt that is adhered along a longitudinal circumference of the chest airbag.

4. The motor vehicle according to claim 3, wherein the membrane belt extends along an exposed curve on the chest airbag.

5. The motor vehicle according to claim 1, wherein the side impact protection system is disposed within doors of the motor vehicle.

6. In a motor vehicle including a vehicle cabin, at least one front seat and at least one rear seat arranged in the cabin, and a side impact protection system comprising a front airbag apparatus associated with the front seat and a rear airbag apparatus associated with the rear seat, wherein each airbag apparatus comprises a chest airbag and a head airbag that is separate from the chest airbag, wherein the head airbag of the rear airbag apparatus includes an additional head protection portion to protect an occupant positioned in a supine position on the front seat, said additional head protection portion extending downward in a vertical direction beside the chest airbag of the rear airbag apparatus, and said additional head protection portion extending in a horizontal direction and located between the chest airbag of the rear airbag apparatus and the chest airbag of the front airbag apparatus, a method for operating the motor vehicle comprises:
inflating the chest airbag and the head airbag by a common gas generator via a manifold.

7. A side impact protection system for a vehicle, said side impact protection system comprising:
a front airbag apparatus associated with a front seat of the vehicle, and
a rear airbag apparatus associated with a rear seat of the vehicle,
wherein each airbag apparatus comprises a chest airbag, a head airbag that is separate from the chest airbag, a manifold connecting the chest airbag and the head airbag, an elastic and gas-tight membrane belt that is fixed along a longitudinal circumference of the chest airbag, and a gas generator for inflating the chest airbag and the head airbag via the manifold,
wherein the head airbag of the rear airbag apparatus includes an additional head protection portion to protect an occupant positioned in a supine position on the front seat, said additional head protection portion extending downward in a vertical direction beside the chest airbag of the rear airbag apparatus, and said additional head protection portion extending in a horizontal direction and located between the chest airbag of the rear airbag apparatus and the chest airbag of the front airbag apparatus.

8. The side impact protection system according to claim 7, wherein the side impact protection system is disposed within doors of the motor vehicle.

* * * * *